UNITED STATES PATENT OFFICE.

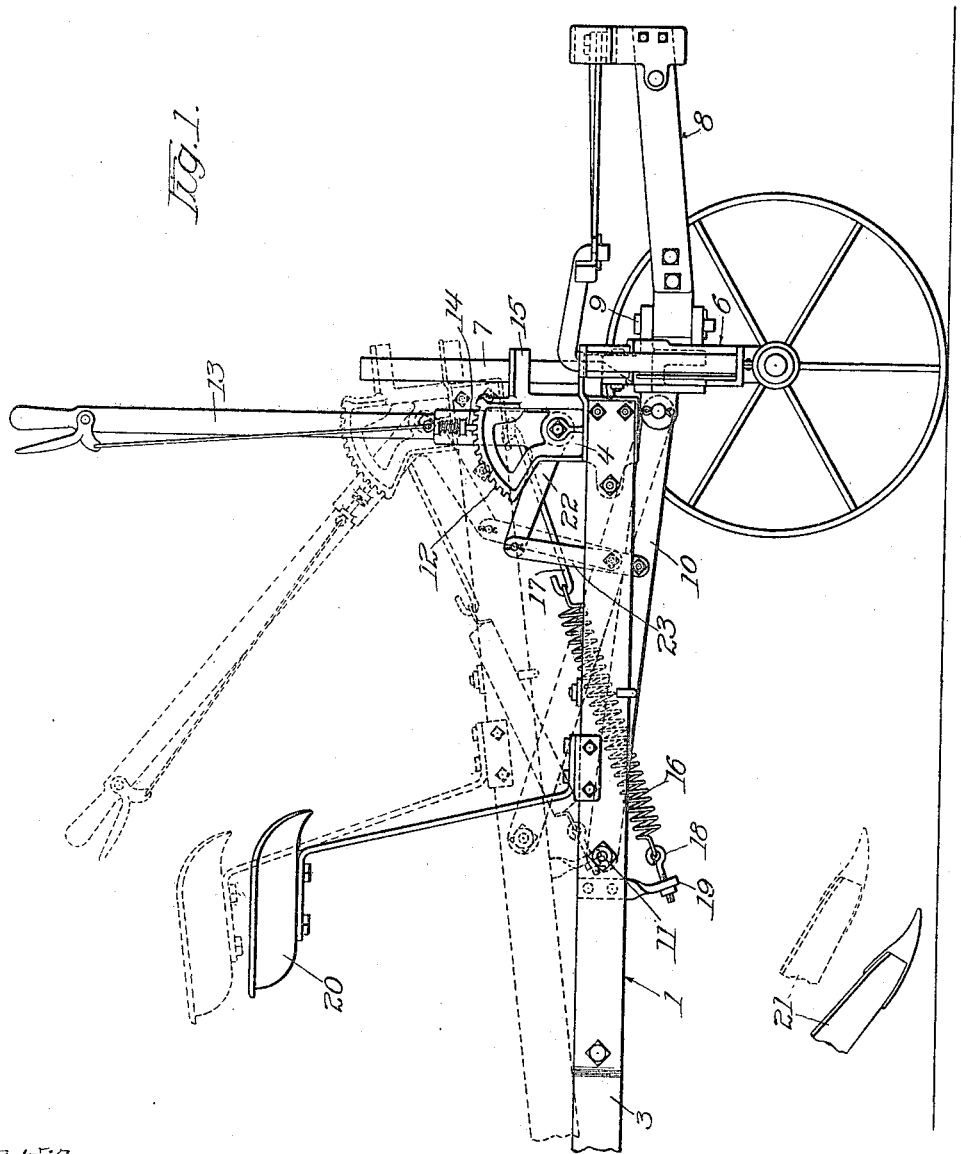

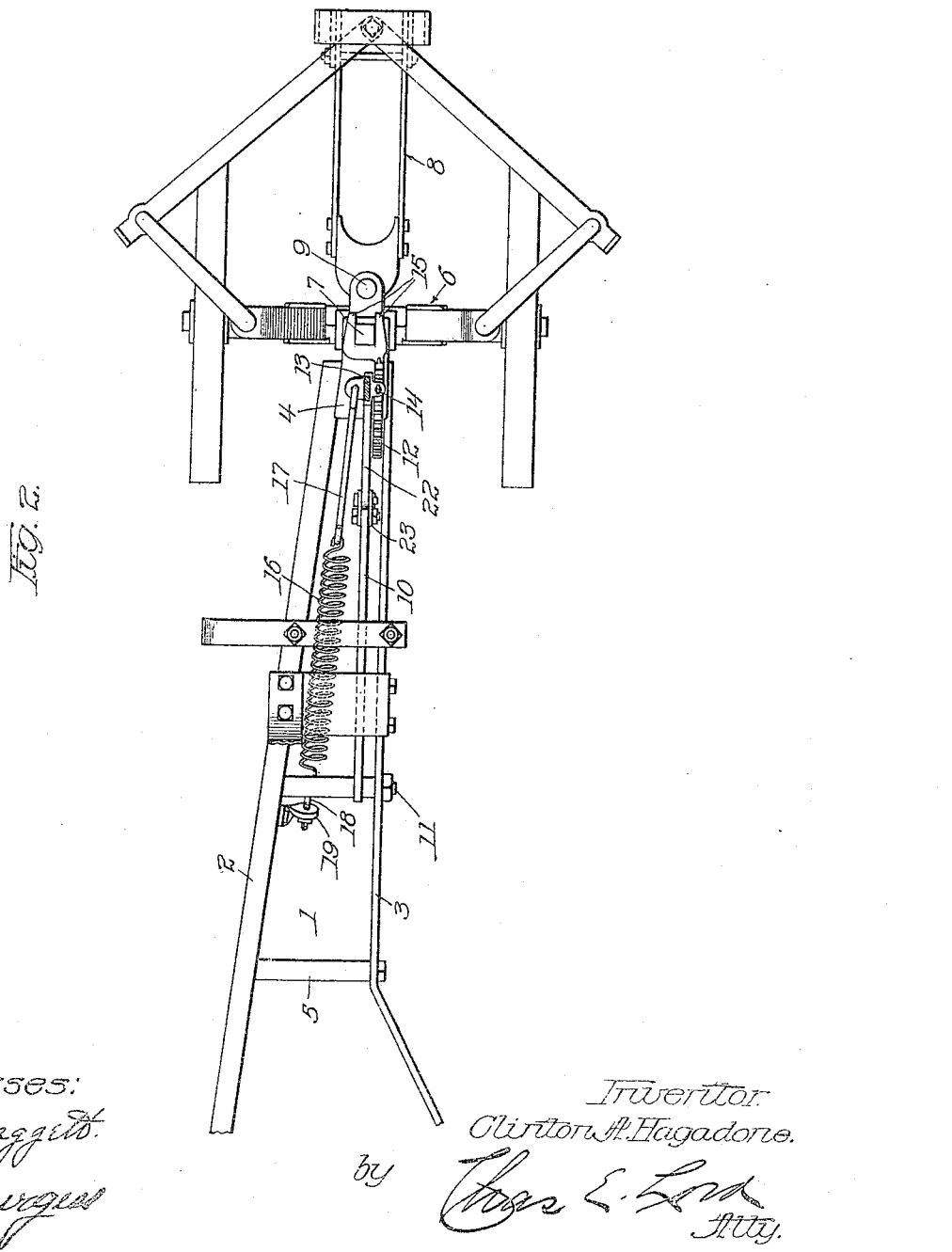

CLINTON A. HAGADONE, OF WESTERN SPRINGS, ILLINOIS, ASSIGNOR TO INTERNATIONAL HARVESTER COMPANY OF NEW JERSEY, A CORPORATION OF NEW JERSEY.

CORN-HARVESTING MACHINE.

1,213,629.

Specification of Letters Patent.  Patented Jan. 23, 1917.

Application filed October 9, 1913.  Serial No. 794,237.

*To all whom it may concern:*

Be it known that I, CLINTON A. HAGADONE, a citizen of the United States, residing at Western Springs, in the county of Cook and State of Illinois, have invented certain new and useful Improvements in Corn-Harvesting Machines, of which the following is a full, clear, and exact specification.

My invention relates to harvesting or other implements in its general adaptation, and is particularly designed for use in connection with corn harvesters having a draft tongue rigidly secured and forming a component part of the frame structure of the machine.

The object of my invention is to provide a construction of tilting mechanism operative to adjust the position of the gathering and cutting mechanism relative to the ground in an easy and positive manner, and to securely hold the machine in adjusted position with little or no departure therefrom. I attain these objects by means of mechanism, one embodiment of which is illustrated in the accompanying drawings, in which—

Figure 1 is a side elevation of part of a corn harvester having my invention embodied in its construction; and Fig. 2 is a top plan view of Fig. 1.

Like reference characters designate like parts throughout the several views.

1 represents part of the draft frame of the machine, including the main frame member 2 and a supplemental frame member 3, converging at their forward ends and secured to a head member 4, and 5 represents a cross tie member near the rear end of the draft frame.

6 represents a tongue truck having a vertically arranged angular standard 7 and a forwardly projecting draft member 8 that is pivotally connected with the truck frame by means of a pin 9; the draft member 8 being designed to receive a draft tongue in any preferred manner. The truck frame is connected with the draft frame 1 by means of a draft bar 10, having its front end pivotally connected with the truck frame and its rear end with a cross bolt 11 upon the frame 1. Integral with the head member 4 is a toothed sector 12, upon which is pivotally mounted a hand lever 13, having a common form of spring-pressed detent mechanism 14 adapted to secure the mechanism in any desired position of adjustment. The head member 4 is also provided with forwardly projecting loop members 15, spaced apart vertically and slidably receiving the angular standard 7.

16 represents a counterbalancing spring having its front end connected with the hand lever 13 by means of a link 17, and its rear end with the draft frame 1 by means of an adjusting eye-bolt 18 and clip member 19.

20 represents an operator's seat carried by the draft frame, and 21 a part of the gathering mechanism of a corn harvester, thought to be sufficient to illustrate the operation of my improved tilting mechanism.

The hand lever 13 is provided with a rearwardly extending arm 22 that is connected with the draft bar 10 by means of a link 23 that controls the position of the end of the frame 1 relative to the tongue truck.

In operation, when the hand lever 13 is in the position shown by full lines in Fig. 1, the front of the draft frame 1 is in its lowest position and gathering mechanism 21 nearest the ground. When the lever is moved rearward, as shown by dotted lines in Fig. 1, the link 23 operates as a fulcrum for the hand lever 13 and the front end of the frame 1 is raised relative to the tongue truck, the gathering mechanism assuming a position farthest from the ground, and the toothed sector and hand lever mechanism may be manipulated in a manner to control the position of the frame 1 at any intermediate point.

Any desired form of tongue truck may be used if means are provided for an adjustable connection between the draft frame of the machine and the truck whereby the front end of the frame may be raised or lowered upon it, and other changes of the associated parts of the mechanism may be made without departing from the spirit of my invention.

What I claim as my invention, and desire to secure by Letters Patent, is:

1. In a harvesting machine, a draft member, a tongue truck slidably connected therewith, and means for raising the draft member relative to the truck, said means including a connecting link between the draft member and tongue truck, a control member, and a fulcruming link between said connecting link and control member.

2. In a harvesting machine, a draft member, a tongue truck, a connection between said truck and said draft member including a draft bar, a hand lever mounted upon said draft member, and a link connection between said hand lever and said draft bar acting as a fulcrum whereby said draft member may be raised or lowered relative to said truck.

3. In a harvesting machine, a draft frame including forwardly extending members having a head secured to their front ends, a tongue truck including a vertically arranged standard, said head being slidably mounted upon said standard, a draft bar connecting said truck with said draft frame, a hand lever mounted upon said draft frame, and a link connection between said hand lever and said draft bar whereby said draft frame may be raised or lowered relative to said truck.

4. In a harvesting machine, a draft frame including forwardly extending members having a head secured to their front ends, a tongue truck including a vertically arranged standard, said standard being slidably mounted in said frame head, a draft bar pivotally connecting said truck and draft frame and disposed between the members of the latter, a lever mounted upon said draft frame, and a link connection between said lever and said draft bar whereby said draft frame may be raised or lowered relative to said truck.

5. In a harvesting machine, a draft frame including forwardly extending members having a head secured to their front ends, said head having forwardly projecting loop members spaced apart vertically and a toothed sector, a tongue truck including a vertically arranged standard slidably received by said loop members, a draft bar connecting said truck with said draft frame, a hand lever mounted upon said frame, a link connection between said hand lever and said draft bar whereby said draft frame may be raised or lowered relative to said truck, and a counterbalancing spring connecting said hand lever with said draft frame.

In testimony whereof I affix my signature, in the presence of two witnesses.

CLINTON A. HAGADONE.

Witnesses:
 PAUL KANE,
 LUCIAN McKICWIER.